(No Model.) 2 Sheets—Sheet 1.

W. H. MURRAY & G. WILLIAMS.
TRAVELING THRASHER.

No. 392,057. Patented Oct. 30, 1888.

(No Model.) 2 Sheets—Sheet 2.

W. H. MURRAY & G. WILLIAMS.
TRAVELING THRASHER.

No. 392,057. Patented Oct. 30, 1888.

Witnesses,
Geo. H. Strong
J. H. Nourse

Inventors,
W. H. Murray.
Geo. Williams.
By Dewey & Co.
atty.

UNITED STATES PATENT OFFICE.

WILLIAM H. MURRAY AND GEORGE WILLIAMS, OF ROSEVILLE, CALIFORNIA.

TRAVELING THRASHER.

SPECIFICATION forming part of Letters Patent No. 392,057, dated October 30, 1888.

Application filed June 21, 1887. Serial No. 242,067. (No model.)

*To all whom it may concern:*

Be it known that we, WILLIAM H. MURRAY and GEORGE WILLIAMS, of Roseville, county of Placer, State of California, have invented an Improvement in Traveling Thrashers; and we hereby declare the following to be a full, clear, and exact description of the same.

Our invention relates to an improved thrashing-machine which is designed to travel about the field and receive the grain and straw directly from the header, which travels independently by its side, said machine being adapted to thrash, clean, and sack the grain at a single operation.

Our invention consists in certain details of construction, which will be more fully explained by reference to the accompanying drawings, in which—

Figure 1:
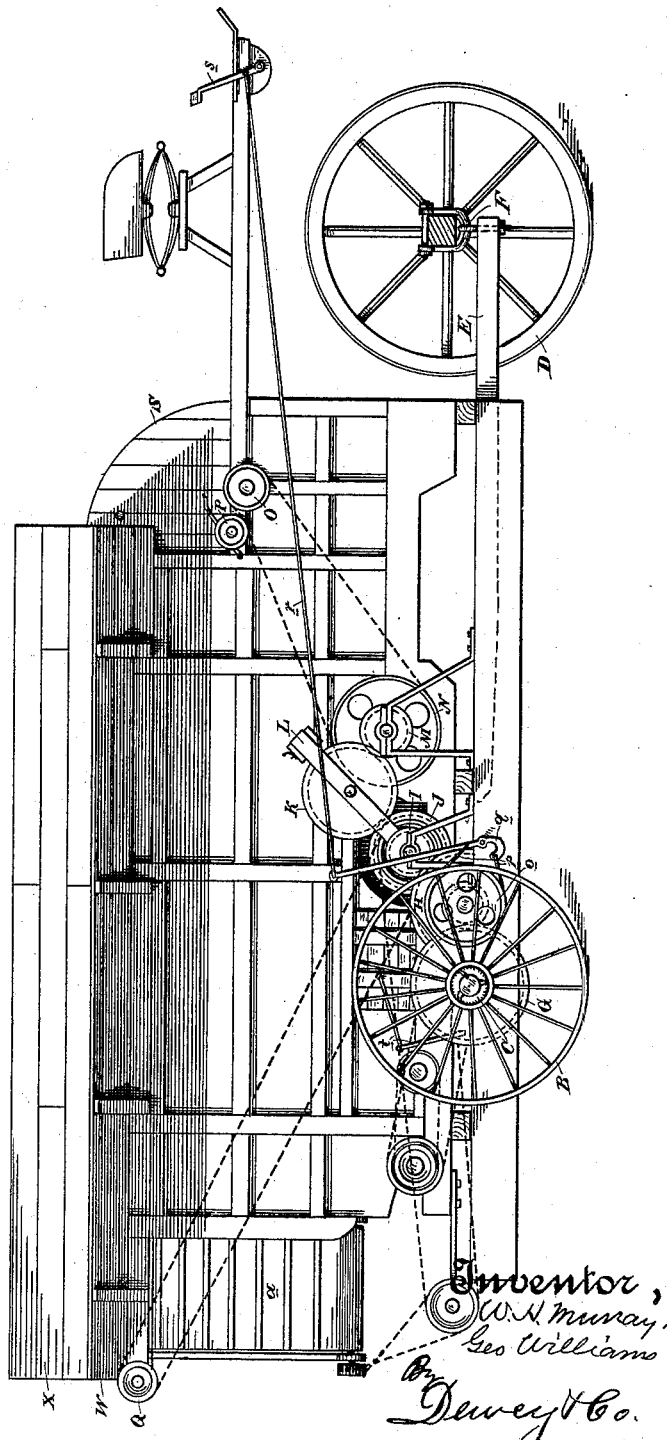
Figure 2:
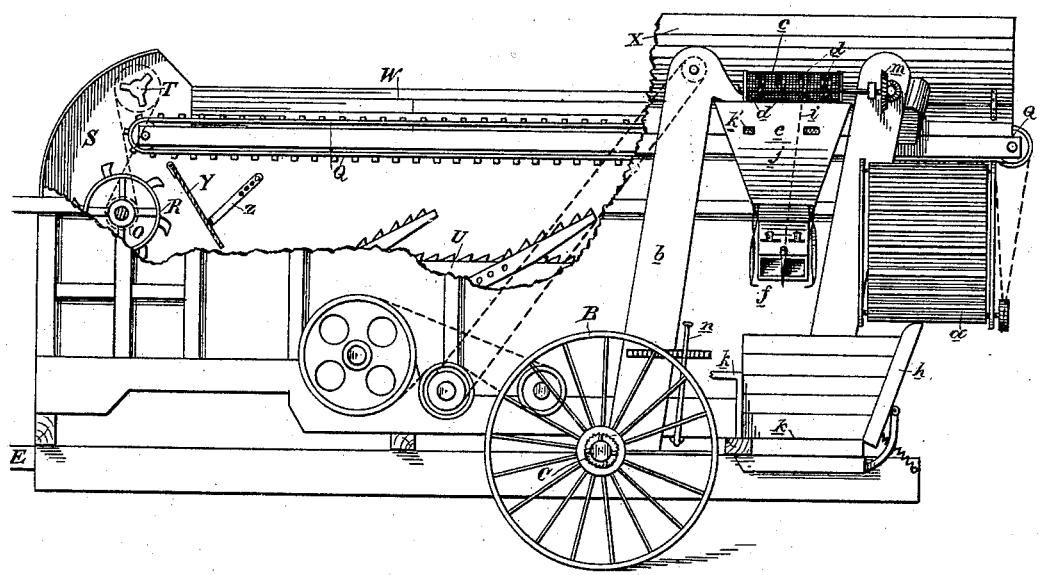
Figure 3:
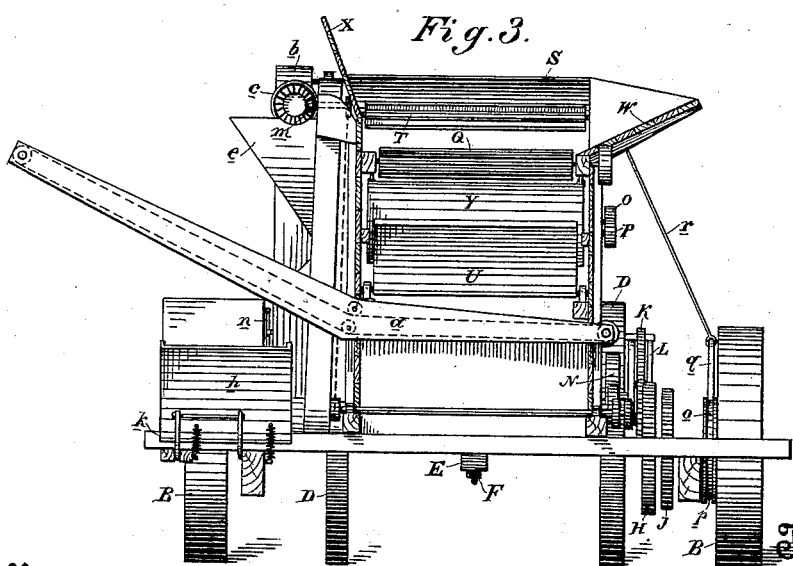

Figure 1 is a right side elevation of our machine. Fig. 2 is a left side view having a part of one side broken away to show the interior construction. Fig. 3 is an end view showing the receiving feeding-belt upon the top of the machine, the double-inclined feed boards and guards, the straw-conveyer, and other details of construction.

In constructing our apparatus we have employed what is known as the "Standard thrashing-machine," having vibrating sections behind the thrashing-cylinder, by the vibrations of which the straw and grain are carried backward and gradually separated from each other, so that the straw may escape at the rear of the machine and the grain be directed to the cleaning-chute. This machine is mounted upon a pair of large bearing-wheels, B, having a common shaft or axle and provided with ratchet-wheels C and pawls, so that when traveling in a straight line both wheels will drive the machinery; but by reason of the pawl-and-ratchet mechanism one wheel may be allowed to travel faster than the other in turning corners. The front end of the machine is supported upon an ordinary pair of wheels, D, by means of a tongue or pole, E, attached to the lower portion of the thrashing-machine and extending forward, having a yoke and swivel-joint, as shown at F, so that these wheels may turn in any direction to steer the machine. The team by which this machine is drawn about the field is attached to the front pair of wheels by doubletrees and the usual appliances. Upon the shaft of the main driving-wheels B is fixed a gear-wheel, G, and this engages a pinion upon a counter-shaft journaled upon the frame in front of the main shaft. Upon the same shaft with this pinion is another gear-wheel, H, which engages the pinion I upon a third shaft journaled upon the frame, and the gear-wheel J upon the same shaft engages with the gear-wheel K, which is an idler journaled upon a movable frame, L, so that it may be thrown into and out of gear at will. This wheel K engages the pinion M upon the shaft of the belt-pulley N, and from this pulley a belt extends to the pulley O on the end of the thrashing-cylinder shaft. This belt is kept at the proper tension at all times by the tightening-pulley P operating in the usual manner.

The header which cuts the grain is driven along beside this thrashing-machine, and the grain is carried up by the usual elevator-belt and is delivered upon a horizontal traveling belt, Q, which passes around drums or rollers journaled at each end of the thrashing-machine and in a central line above the vibrating straw carrier and separator. This belt, traveling above the machinery of the thrasher and also above the cylinder, carries the straw from the rear of the machine toward the front, discharging it just above the thrashing-cylinder R and within the semicircular casing S, which incloses this end of the machine.

Above the discharge end of the belt Q is a picker, T, which serves to separate and distribute any masses of straw which may be too large to pass properly through the machine, and it is thus delivered rapidly to the thrashing-cylinder, which receives it and carries it through the concave, thrashing the straw which is received upon the vibrating toothed sections U, and by them carried backward in the manner usual to this class of machines. As this forms no portion of our invention, we do not describe it further in the present case.

Upon each side of the top of the machine are feed and guard boards W and X, the board W standing at such an incline as to direct the grain upon the belt as it is received from the header, while the board X stands more nearly vertical and serves to prevent the straw from being thrown too far over the machine.

That portion of the belt Q which returns within the thrashing-machine and above the separator portion U forms the top of the space above the straw-carrier and assists to carry the straw backward by its own movement in that direction.

Y is a hinged swinging gate, which stands at an angle behind the thrashing-cylinder and between it and the straw-receiving sections of the separator, this gate being adjusted to any angle by means of perforated straps Z, by which its lower end may be raised or depressed at will.

The straw discharged from the rear end of the apparatus is received upon a carrying-belt, $a$, which travels constantly across this end and extends out to some distance to one side, so that straw may be delivered from it directly into a wagon to be carried away, instead of falling upon the ground.

The grain which is discharged from the cleaning-chute is elevated in the usual manner within the case $b$, and at the upper end is discharged into a revolving screen-cylinder, $c$, which has spiral flanges at $d$ arranged along its interior periphery, so that as this cylinder revolves it gradually carries grain and lighter material from one end to the other by reason of these spiral flanges. At the same time in its revolution the heavy grain falls through the openings in the last part of the cylinder and descends into a hopper, $e$, having a sacking attachment and gate connected with the mouth at $f$, so that the sack-tender, sitting upon the platform $k$, may attend to this business.

As fast as the grain is sacked the sacks are sewed and then leaned against the inclined board $h$, which is supported by a spring, so that when the weight of the sack leans against the board it will overcome the tension of the spring and allow it to tip down and discharge the sack upon the ground, the board again returning to its position to receive another sack. The lighter and more worthless material is discharged through the revolving screen $c$ before the vertical partition or diaphragm $i$, which stands in the middle of the hopper, and this class of material falls into the compartment $j$, where it is allowed to remain until it rises to a point which may be indicated by a screen or window, $k'$, or other means, after which, the wheat-gate remaining closed, the discharge-gate for this portion of the hopper is opened, and the material thus collected may be sacked ready to be carried away.

The revolving screen is driven by a shaft and beveled gearing, as shown at $m$. In order to control the blast of wind and keep the cleaning mechanism thoroughly within the control of the operator, I have shown a lever-arm, $n$, near the sacker's platform, which may be moved to one side or the other, and this lever is connected by rods $t$ with wind-boards, which open or close the air-passages to the fan, and thus increase or diminish the supply so that the sacker can keep accurate control of the cleaning.

In order to control the movements of the machine and the team drawing it, which sometimes becomes unmanageable, I have constructed a brake, which acts as follows: Upon the same shaft with the gear-wheel H is fixed a band-wheel, $o$, and around this wheel passes a steel or iron strap, $p$, one end of which may be fixed stationary or connected with one part of a lever, $q$, while the other end is connected with the same lever at the opposite side of its fulcrum. From the long arm of this lever a rod, $r$, extends forward and connects with a lever, $s$, within reach of the driver, and through this mechanism he is enabled to apply the powerful band-brake to the wheel $o$, and as this wheel is speeded up from the gearing upon the main axle it will be manifest that any brake applied to this point will have an extremely powerful action upon the main wheels and can easily prevent their rotation.

Having thus described our invention, what we claim as new, and desire to secure by Letters Patent, is—

1. In a thrashing and separating machine, the combination of the machine-casing, the cylinder and concave, the straw-carrier, and the endless belt, the upper portion of which serves to feed the grain to the cylinder, and the lower portion forms the top of the space over the straw-carrier and assists the travel of the straw over it, substantially as set forth.

2. The combination of the machine-casing, the cylinder and concave, the straw-carrier, and the horizontal endless feed-belt located over and parallel with the straw-carrier and serving to assist in the travel and discharge of the straw, substantially as set forth.

In witness whereof we have hereunto set our hands.

WILLIAM H. MURRAY.
GEORGE WILLIAMS.

Witnesses:
J. D. PRATT,
R. F. THEILE.